March 10, 1953 R. G. HOOPINGARNER 2,630,663
PICKUP MEMBER FOR LAWN DEBRIS
Filed Feb. 8, 1950

INVENTOR.
Revere G. Hoopingarner.
BY
Myron J. Seibold
ATTORNEY.

Patented Mar. 10, 1953

2,630,663

UNITED STATES PATENT OFFICE 2,630,663

PICKUP MEMBER FOR LAWN DEBRIS

Revere G. Hoopingarner, Royal Oak, Mich.

Application February 8, 1950, Serial No. 143,001

6 Claims. (Cl. 56—1)

This invention relates to a pick-up device facilitating the removal of leaves, twigs and other debris from ground surfaces, such as lawns.

The removal of debris from lawns is conventionally effected by raking or sweeping the debris on tarpaulins, blankets, or other cloths which are thereafter bundled up to facilitate the carrying of the debris. In this operation, it is difficult to maintain the edge of the cloth in position so that the debris may be raked or swept thereon. It is the object of the present invention to provide a rigid member at the edge of the pick-up cloth which is anchored in the ground and over which the debris to be removed is moved.

Another object of the invention is the provision of a pick-up member in accordance with the preceding object in which the pick-up member is provided with prongs which are pressed into the ground and in which the front edge of the pick-up member is in the form of teeth to facilitate its entrance into the grass of the lawn.

Another object of this invention is the provision of a pick-up member in accordance with the preceding objects, provided with clamping means for removably attaching it to a pick-up cloth.

Another object of this invention is the provision of a pick-up member in accordance with the preceding objects in which means are provided for elevating the back edge of the member so that its top surface is substantially horizontal.

Other objects and features of the invention will be readily apparent to those skilled in the art from the specification and appended drawing illustrating certain preferred embodiments in which.

Figure 1:
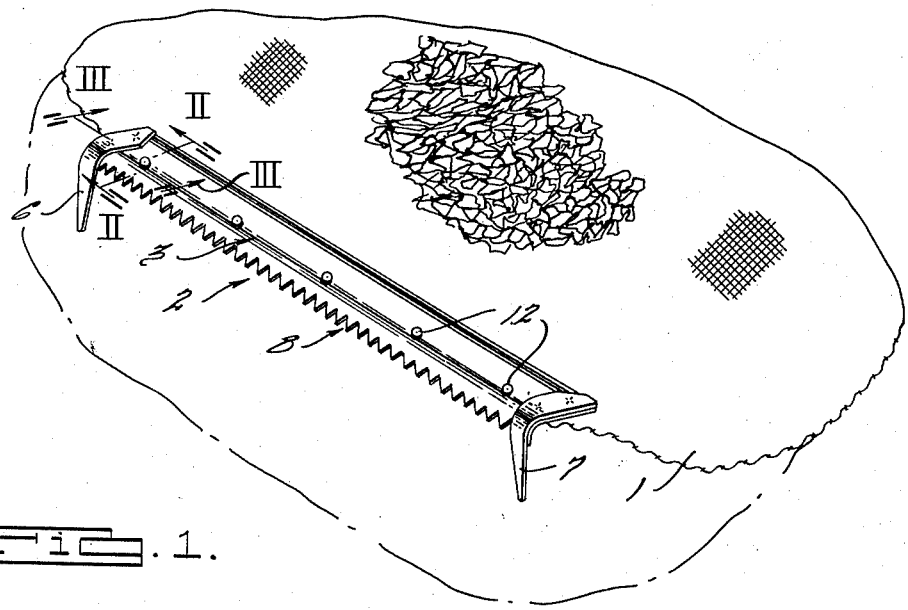
Figure 1 is a perspective view of the pick-up member according to the present invention in place upon a pick-up cloth.

In Figure 1, the pick-up cloth is shown at 1 and is cut away so that only a small portion thereof adjacent the pick-up member is shown. The pick-up member which is indicated generally at 2 extends along only a portion of the edge of the pick-up member as it is desired to keep it small and light for convenience of handling and it is ordinarily made slightly longer than the width of the conventional rake. The pick-up member comprises a main body portion 3 having a top portion 4 presenting a relatively flat top surface and a rounded portion 5 presenting a downwardly extending forward surface. The body portion 3 may be formed of any desired relatively rigid material such as sheet metal, fiber, plastic, rubber etc., and is provided at its opposite ends with prongs 6 and 7 which, in the specific embodiment illustrated in the drawing, are welded to the top surface of the body portion 3 as indicated by the cross marks and then extend downwardly substantially at right angles to the top surface 4 of the apron 3 so that the prongs 6 and 7 may be inserted into the ground as shown in Figure 2 to hold the apron in place.

Figures 2, 3:
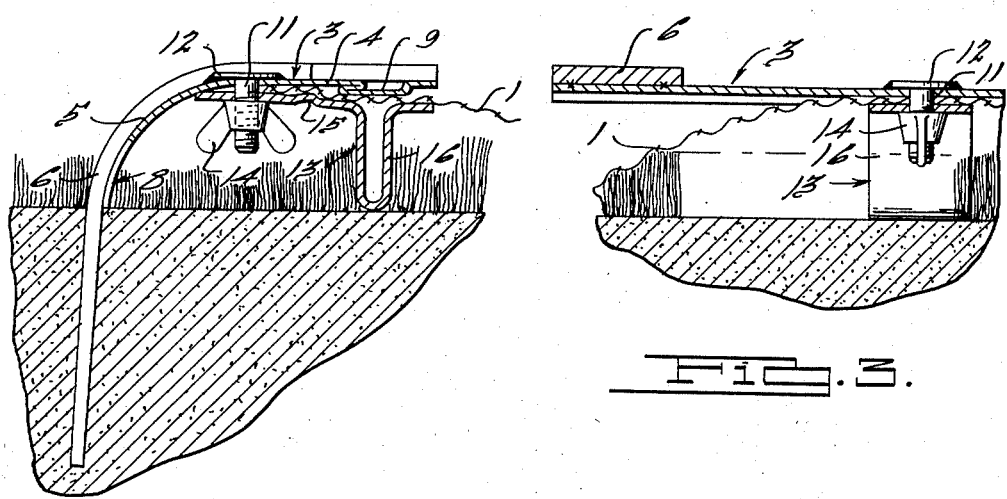
Figure 2 is an enlarged sectional view on the line II—II of Figure 1.
Figure 3 is an enlarged sectional view on the line III—III of Figure 1.

The bottom edge of the portion 5 of the main body portion 3 is provided with a plurality of teeth 8 to facilitate the entrance of the forward edge of the pick-up member into the grass of the lawn, again as shown in Figure 2, so that the debris to be picked up will be sure to pass over the pick-up member 2. The portion 4 of the apron 3 is provided with a crimped or bent portion 9 to strengthen the member against transverse bending.

In the top portion 4, and spaced along its length, are secured a plurality of studs 11 by having their heads 12 welded or brazed thereto. At the underside of the portion 4 there are provided a plurality of clamps 13 which slide over the studs 11 and are clamped thereon by wing nuts 14. The clamps 13 are to secure the pick-up member 12 to the pick-up cloth 1, and are shown more particularly in the section of Figure 2. the clamps 13 each including a ridge 15 to facilitate clamping of the pick-up cloth and a return bent loop 16 serving as a stand to elevate the back edge of the pick-up member so that the surface of its top portion 4 is, in use, substantially horizontal.

With the invention as shown, the pick-up member 2 may be readily attached and detached from pick-up cloths as desired. It is, of course, within the scope of the invention that the pick-up member may be crimped, riveted, or otherwise permanently attached to a pick-up cloth where the removability feature is not desired. It is also to be understood that the pick-up cloth may be attached at its opposite edge to a cart or container as well as being bodily movable in the form of a bundle.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. A pick-up member for lawn debris comprising a main body portion attachable to a pick-up cloth and having a top surface and a downwardly projecting forward surface, prongs on said body portion adapted to be inserted into the ground to anchor the pick-up member in position, and a plurality of teeth on the forward edge of said pick-up member to facilitate its insertion into the grass of the lawn.

2. A pick-up member for lawn debris comprising a main body portion attachable to a pick-up cloth and having a top surface and a downwardly projecting forward surface, means on said body portion for attaching the pick-up member to a pick-up cloth, and prongs on said body portion adapted to be inserted into the ground to anchor the pick-up member in position, said attachment means including manually manipulable clamps secured to the underside of said pick-up member.

3. A pick-up member for lawn debris comprising a main body portion attachable to a pick-up cloth and having a top surface and a downwardly projecting forward surface, means on said body portion for attaching the pick-up member to a pick-up cloth, prongs on said body portion adapted to be inserted into the ground to anchor the pick-up member in position, said attachment means including manually manipulable clamps secured to the underside of said pick-up member, and a plurality of teeth on the forward edge of said pick-up member to facilitate its insertion into the grasses of the lawn.

4. A pick-up member for lawn debris comprising a main body portion attachable to a pick-up cloth and having a top surface and a downwardly projecting forward surface, means on said body portion for attaching the pick-up member to a pick-up cloth, and prongs on said body portion adapted to be inserted into the ground to anchor the pick-up member in position, said attachment means including manually manipulable clamps secured to the underside of said pick-up member, said clamps being spaced along the length of said pick-up member and including step portions for elevating the rear edge of the pick-up member.

5. A pick-up member for lawn debris comprising a main body portion attachable to a pick-up cloth and having a top surface and a downwardly projecting forward surface, prongs on said body portion adapted to be inserted into the ground to anchor the pick-up member in position, a plurality of studs secured to said pick-up member spaced along its length and extending beyond its under surface, clamping elements disposed on said studs, and means threaded on said studs for clamping a pick-up cloth between said clamping elements and the under surface of the pick-up member.

6. A pick-up member for lawn debris comprising a main body portion attachable to a pick-up cloth and having a top surface and a downwardly projecting forward surface, prongs on said body portion adapted to be inserted into the ground to anchor the pick-up member in position, a plurality of studs secured to said pick-up member spaced along its length and extending beyond its under surface, clamping elements disposed on said studs, means threaded on said studs for clamping the pick-up cloth between said clamping elements and the under surface of the pick-up member, and a plurality of teeth on the front edge of said pick-up member to facilitate its insertion into the grasses of the lawn.

REVERE G. HOOPINGARNER.

REFERENCES CITED

The following references are of record in the file of this patent:

UNITED STATES PATENTS

| Number | Name | Date |
|---|---|---|
| 219,080 | Edwards | Sept. 2, 1879 |
| 389,697 | Fleming et al. | Sept. 18, 1888 |
| 732,838 | Edwards | July 7, 1903 |
| 1,182,190 | Magami | May 9, 1916 |